(12) United States Patent
Krischer et al.

(10) Patent No.: US 9,755,943 B2
(45) Date of Patent: Sep. 5, 2017

(54) LOCATION BASED TECHNIQUE FOR DETECTING DEVICES EMPLOYING MULTIPLE ADDRESSES

(71) Applicant: CISCO TECHNOLOGY, INC., San Jose, CA (US)

(72) Inventors: Mark Krischer, Pymble (AU); Tom Koenig, Pattaya (TH); Nancy Cam-Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 552 days.

(21) Appl. No.: 13/961,991

(22) Filed: Aug. 8, 2013

(65) Prior Publication Data
US 2015/0042792 A1    Feb. 12, 2015

(51) Int. Cl.
| | | |
|---|---|---|
| *G06F 3/00* | (2006.01) | |
| *G06F 13/00* | (2006.01) | |
| *G06F 13/36* | (2006.01) | |
| *G06F 12/14* | (2006.01) | |
| *G06F 13/14* | (2006.01) | |
| *H04L 12/26* | (2006.01) | |
| *H04N 7/18* | (2006.01) | |
| *H04L 29/06* | (2006.01) | |
| *H04W 12/12* | (2009.01) | |
| *H04L 29/12* | (2006.01) | |

(52) U.S. Cl.
CPC .......... *H04L 43/16* (2013.01); *H04L 63/1458* (2013.01); *H04N 7/18* (2013.01); *H04W 12/12* (2013.01); *H04L 61/2015* (2013.01); *H04L 2463/141* (2013.01)

(58) Field of Classification Search
CPC . G06F 12/0246; G06F 15/17343; H04L 12/66
USPC .......................... 710/305, 11, 107, 118, 200
See application file for complete search history.

(56) References Cited

U.S. PATENT DOCUMENTS

| | | | |
|---|---|---|---|
| 7,240,106 B2* | 7/2007 | Cochran | H04L 29/12009 709/220 |
| 7,676,216 B2 | 3/2010 | Stieglitz et al. | |
| 7,971,253 B1 | 6/2011 | Gupta | |
| 8,887,280 B1* | 11/2014 | Dickinson | H04L 63/1458 726/23 |
| 2002/0161867 A1* | 10/2002 | Cochran | H04L 29/12009 709/221 |
| 2004/0019704 A1* | 1/2004 | Sano | G06F 15/17343 709/252 |
| 2006/0085579 A1* | 4/2006 | Sato | G08C 17/02 710/73 |

(Continued)

FOREIGN PATENT DOCUMENTS

GB     2362301 A     11/2001

*Primary Examiner* — Ernest Unelus
*Assistant Examiner* — Getente A Yimer
(74) *Attorney, Agent, or Firm* — Patterson+Sheridan, LLP (57) ABSTRACT

In an example embodiment, there is described herein a location based detection technique that determines whether multiple requests from different addresses, such as a Layer 2 MAC (Media Access Control) address and/or layer 3 IP (Internet Protocol) address are being sent form a single device. In particular embodiments, if the device sends more than a predefined threshold number of requests, those requests can be ignored and/or denied.

21 Claims, 5 Drawing Sheets

(56) References Cited

U.S. PATENT DOCUMENTS

| | | | |
|---|---|---|---|
| 2006/0165124 A1* | 7/2006 | Yeh | G06F 12/0292 370/469 |
| 2006/0193299 A1 | 8/2006 | Winget et al. | |
| 2006/0236040 A1* | 10/2006 | Uehara | G06F 12/0831 711/150 |
| 2008/0184331 A1 | 7/2008 | Cam-Winget et al. | |
| 2009/0070520 A1* | 3/2009 | Mizushima | G06F 12/0246 711/103 |
| 2009/0083522 A1* | 3/2009 | Boggs | G05B 19/056 712/220 |
| 2009/0125981 A1 | 5/2009 | Krischer et al. | |
| 2010/0138585 A1* | 6/2010 | Donaghey | H04L 12/66 710/315 |
| 2011/0030032 A1 | 2/2011 | Baykal et al. | |

* cited by examiner

LOCATION BASED TECHNIQUE FOR DETECTING DEVICES EMPLOYING MULTIPLE ADDRESSES

TECHNICAL FIELD

The present disclosure relates generally to network security and/or detecting devices that employ a plurality of virtual machines.

BACKGROUND

A Dynamic Host Configuration Protocol (DHCP) starvation attack occurs when an attacker continuously and repeatedly requests an Internet Protocol (IP) address to empty out an address pool. To combat this, a Wireless Local Area Network Controller (WLC) of a network acts as a proxy and ensures only a single request comes and/or is processed from each device.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein a technique that determines whether a plurality of requests from a different address are associated with a device, based on location information of the plurality of requests. In particular embodiments, corrective action may be taken if the number of requests from the device exceeds a predetermined threshold.

In accordance with an example embodiment, there is disclosed herein logic encoded in a tangible, non-transitory, computer readable medium for execution by a processor, and when executed by the processor operable to receive a request from a device, the request having an associated address. The logic is further operable to obtain a location of the device. The logic determines, based on the location of the device, whether the device has made at least one previous request using a different address than the associated address.

In accordance with an example embodiment, there is disclosed herein an apparatus comprising an interface and detection logic operably coupled with the interface and operable to obtain data via the interface. The detection logic is operable to receive a request from a device for an Internet Protocol (IP) address, the request having an associated media access control (MAC) address. The detection logic is operable to obtain a location of the device. The detection logic is operable to determine based on the location of the device, whether the device has made at least one prior request for an IP address using a MAC address different than the associated MAC address.

In accordance with an example embodiment, there is disclosed herein a method that comprises receiving a plurality of requests from a plurality of Internet Protocol (IP) addresses. One or more locations are determined for the plurality of requests. A processor determines, based on the one or more locations of the plurality of requests, whether the requests were sent by a single device.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is disclosed herein a technique that determines based on location information of a device, whether the device is making a plurality of requests using a different address. As will be described in more detail herein, the technique is employed to make numerous advantageous determinations including to determine whether a device is a device with a plurality of virtual machines, such as a virtual desktop interface (VDI) device and/or whether the device is performing an address starvation attack.

Figure 1:
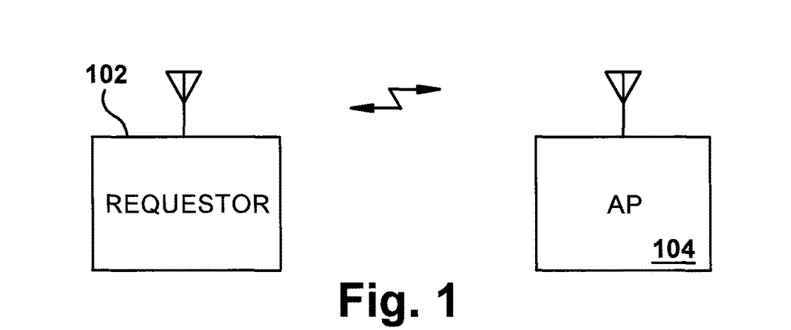
FIG. 1 is a block diagram illustrating an access point operable to determine based on a location of a device submitting a request whether the device is employing multiple addresses based on the device's location.

FIG. 1 is a block diagram illustrating an access point (AP) 104 operable to determine whether a requestor (device) 102 submitting a request is employing multiple addresses based on the location of the device. The access point 104 comprises detection logic (not shown, see e.g., FIG. 3) for determining whether the device 102 submitting a request is employing multiple addresses based on the device's location. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In accordance with the example embodiment, the AP 104 receives a request from the device 102, the request having an associated address. The request may be any type of request for a network service, such as including but not limited to requesting an Internet Protocol (IP) address, requesting a data, video, audio and/or audiovisual stream, and/or requesting access to an application, etc.

Further in accordance with the example embodiment, the AP 104 then obtains a location of the device 104. The AP 104 may determine the location and/or may obtain data representative of a location from another device, such as a location server.

Still further in accordance with the example embodiment, the AP 104 determines, based on the location of the device 202, whether the device 102 has made at least one previous request using a different address than the address associated with the request. The address with the request can be a layer 2 (L2) address such as a Media Access Control (MAC) address or a layer 3 address such as an IP address. Layers as used herein refers to the Open Systems Interconnection (OSI) layers.

In an example embodiment, the request is a DHCP request for an IP address. The logic in AP 104 when executed by a processor is operable to determine whether the number of requests for an IP address by the device 102 exceed a predefined threshold. If the number of requests from the device 102 exceeds the predefined threshold, the logic in AP 104 is further operable to take corrective action. For example, the logic in AP 104 selectively re-allocates IP addresses previously assigned to the device 102 (for example return them to the available address pool and/or re-assign them to other devices), selectively ignores the request, selectively transmits an alert, and/or selectively activates video surveillance of the location of the device.

In an example embodiment, if there are multiple requests for a service from the same device (e.g., device 102) using different addresses, the logic in AP 104 is operable to selectively assume or otherwise conclude that device employs multiple virtual machines (VMs) and provide support for virtual machine applications. As another example, the logic in AP 104 is further operable to determine a bandwidth limitation for the device and exceed its bandwidth limitations by using different addresses for different applications and/or sessions. The logic in AP 104 aggregates bandwidth usage for different addresses (such as, for example, IP addresses) associated with the device; and limits the bandwidth of the device responsive to determining the device is exceeding the bandwidth limitation. In particular embodiments, the logic in AP 104 is further operable to determine applications associated with the device that are using bandwidth. For example, the logic in AP 104 may selectively employ "Network Based Application Recognition" (NBAR) available from Cisco Systems, Inc., 170 West Tasman Dr., San Jose, Calif. 95134, www.cisco.com) to identify applications. Any other methods, products, applications and/or techniques now known or hereinafter developed to identify applications may be used as well. The logic in AP 104 is further operable to determine a priority for the applications associated with the device 102 that are using bandwidth and limit the bandwidth consumption for lower priority applications. For example the bandwidth for a first application having a lower priority than a second application may be limited while the bandwidth second application is not limited. For instance, by way of a particular but non-limiting example, the logic in AP 104, using NBAR, determines if a first application is a Telepresence™ (available from Cisco Systems, Inc., 170 West Tasman Dr., San Jose, Calif. 95134, www.cisco.com) session, which is probably work related, or Skype which may be assumed to be for personal use, wherein the logic in AP 104 is operable to prioritize the Telepresence™ session and Skype application accordingly such as, for example, in accordance with a predetermined prioritization scheme or the like.

Figure 2:
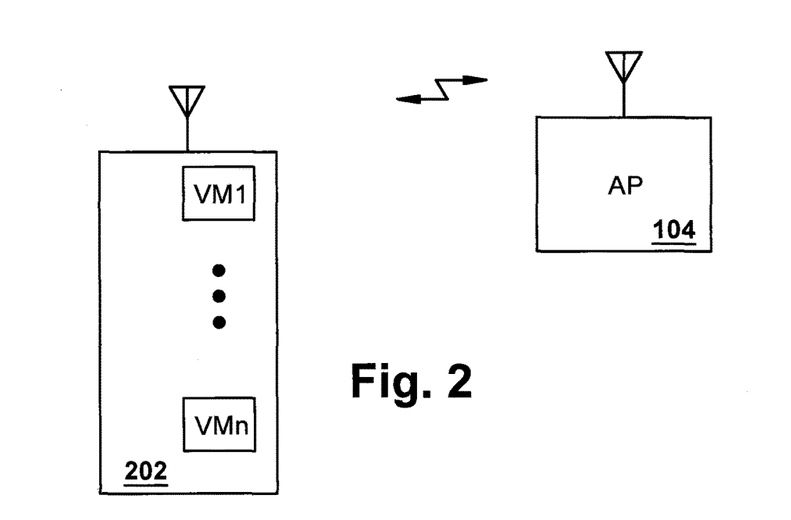
FIG. 2 is a block diagram illustrating an access point receiving a request from a device with a plurality of virtual machines.

FIG. 2 is a block diagram illustrating an access point 104 receiving a request from a device 202 with a plurality of virtual machines (VM1 . . . VMn). AP 104 receives a request from the device 202, the request having an associated address. The request may be any type of request for a network service, such as including but not limited to requesting an IP (Internet Protocol) address, requesting a data, video, audio and/or audiovisual stream, and/or requesting access to an application, etc.

In accordance with the example embodiment, the AP 104 then obtains a location of the device 202. The AP 104 may determine the location and/or may obtain data representative of a location from another device, such as a location server.

The AP 104 determines, based on the location of the device 202, whether the device 202 has made at least one previous request using a different address than the address associated with the request. The address with the request can be a layer 2 (L2) address such as a MAC (Media Access Control) address or a layer 3 address such as an IP address.

In an example embodiment, the request is a DHCP request for an IP address. The logic in AP 104 determines whether the number of requests for an IP address by the requestor 202 exceed a predefined threshold. If the number of requests from the requestor 202 exceeds the predefined threshold, the logic in AP 104 is further operable to take corrective action. For example, the logic in AP 104 may re-allocate IP addresses previously assigned to the device 202 (for example return them to the available address pool and/or re-assign them to other devices), ignore the request, transmit an alert, and/or activate video surveillance of the location of the device.

In an example embodiment, upon determining that the same device 202 is using different addresses, the logic in AP 104 selectively provides support for virtual machine applications. As another example, the logic in AP 104 is further operable to determine a bandwidth limitation for the device and exceed its bandwidth limitations by using different addresses for different applications and/or sessions. The logic in AP 104 may aggregate bandwidth usage for different addresses (such as, for example, IP addresses) associated with the device; and limit the bandwidth of the device responsive to determining the device is exceeding the bandwidth limitation. In particular embodiments, the logic in AP 104 may be further operable to determine applications associated with the device that are using bandwidth. For example, the logic in AP 104 may employ NBAR ("Network Based Application Recognition" available from Cisco Systems, Inc., 170 West Tasman Dr., San Jose, Calif. 95134, www.cisco.com) to identify applications. The logic in AP 104 may be further operable to determine a priority for the applications associated with the device that are using bandwidth and limit the bandwidth consumption for lower priority applications. For example the bandwidth for a first application having a lower priority than a second application may be limited while the bandwidth second application is not limited. For instance, the logic in AP 104, using NBAR, can determine if a first application is a Telepresence™ session (which is probably work related), or Skype (which may be assumed to be for personal use) wherein the logic in AP 104 is operable to prioritize the Telepresence™ session and Skype application accordingly such as, for example, in accordance with a predetermined prioritization scheme or the like.

Figure 3:
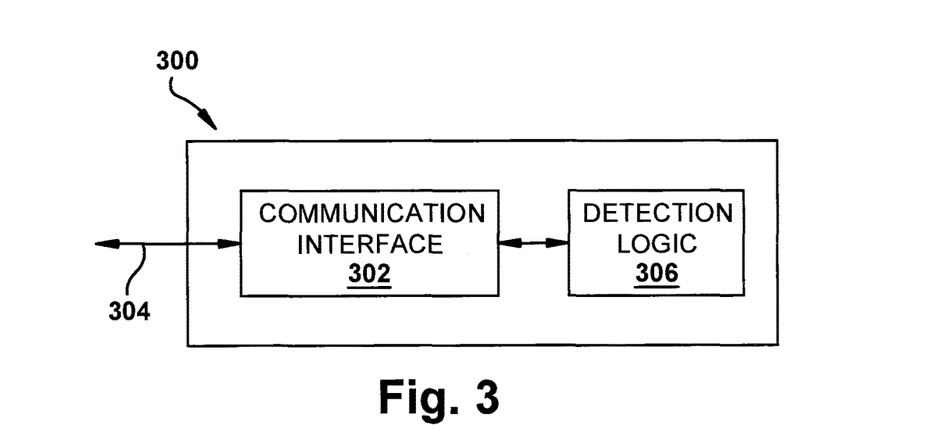
FIG. 3 is a block diagram illustrating an example of an apparatus operable to detect whether a device is employing multiple addresses based on the device's location.

FIG. 3 is a block diagram illustrating an example of an apparatus 300 operable to detect whether a device is employing multiple addresses based on the device's location. The apparatus comprises an interface 302 (e.g., a communication interface which may be a wired and/or wireless interface) coupled with a communication link 304. In an example embodiment, the communication interface 302 provides bi-directional communications on communication link 304. The apparatus 300 further comprises detection logic 306 that is operably coupled with the interface 302 and operable to obtain data via the interface 302.

In an example embodiment, the detection logic 306 is operable to receive a request from a device (not shown) via the interface 302 for an Internet Protocol (IP) address (e.g., a DHCP request), the request having an associated media access control (MAC) address. The detection logic 306 is operable to obtain a location of the device. The detection logic 306 is further operable to determine, based on the location of the device, whether the device has made at least one prior request for an IP address with a different MAC address.

In an example embodiment, the request is a DHCP request for an IP address. The detection logic 306 determines whether the number of requests for an IP address by the device exceeds a predefined threshold. If the number of requests from the device exceeds the predefined threshold, the detection logic 306 is further operable to take corrective action. For example, the logic the detection logic 306 selectively re-allocates IP addresses previously assigned to the device (for example returns them to the available address pool and/or re-assign them to other devices), selectively ignores the request, selectively transmits an alert, and/or selectively activates video surveillance of the location of the device.

In particular embodiments, the detection logic 306 may determine whether the device has used the previously assigned addresses. For example, if the device has requested a plurality of IP addresses and is not using them, this can be indicative of an address starvation attack, and detection logic 306 may take corrective action.

In an example embodiment, if there are multiple requests for a service from the same device using different addresses, the detection logic 306 may assume that device employs multiple virtual machines (VMs) and provide support for virtual machine applications. As another example, the detection logic 306 may be further operable to determine a bandwidth limitation for the device and exceed its bandwidth limitations by using different addresses for different applications and/or sessions. The detection logic 306 may aggregate bandwidth usage for different addresses (such as, for example, IP addresses) associated with the device; and limit the bandwidth of the device responsive to determining the device is exceeding the bandwidth limitation. In particular embodiments, the detection logic 306 may be further operable to determine applications associated with the device that are using bandwidth. For example, the detection logic 306 may employ NBAR (described herein supra) to identify applications. The detection logic 306 may be further operable to determine a priority for the applications associated with the device that are using bandwidth and limit the bandwidth consumption for lower priority applications. For example the bandwidth for a first application having a lower priority than a second application may be limited while the bandwidth second application is not limited. For instance, the logic in AP 104, using NBAR, can determine if a first application is a Telepresence™ session (which is probably work related), or Skype (which may be assumed to be for personal use) wherein the logic in AP 104 is operable to prioritize the Telepresence™ session and Skype application accordingly such as, for example, in accordance with a predetermined prioritization scheme or the like.

Figure 4:
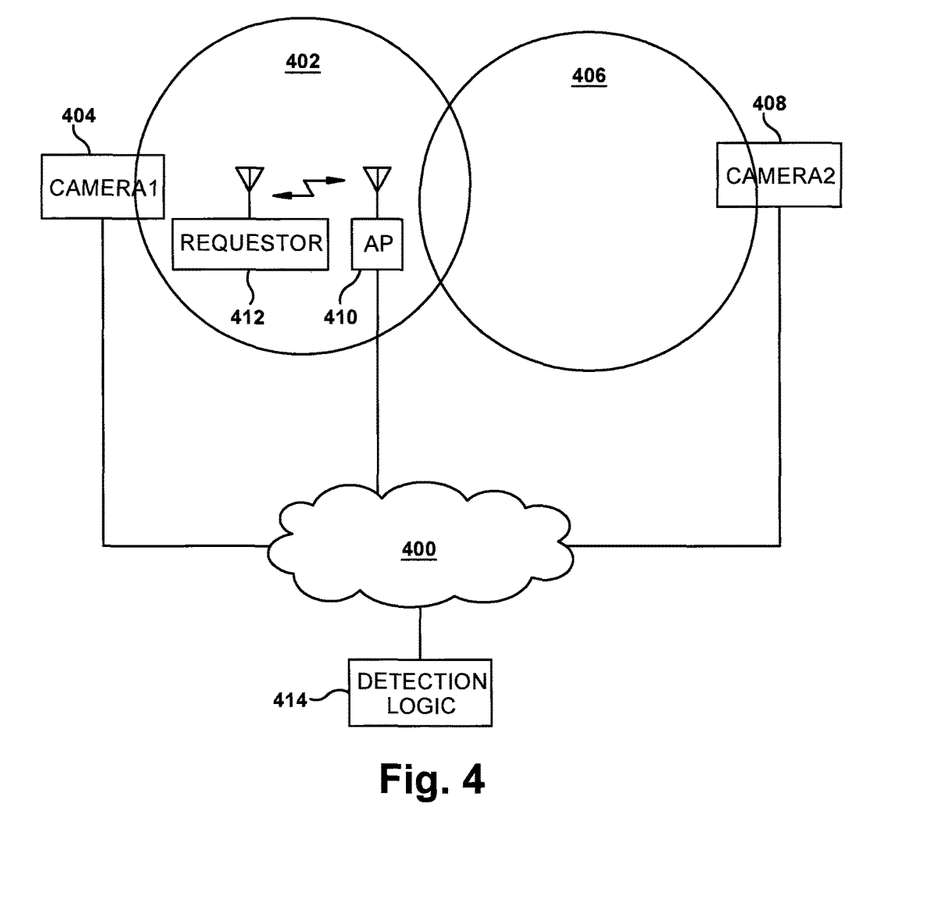
FIG. 4 illustrates an example of a network employing an apparatus operable to detect whether a device is employing multiple addresses based on the device's location that is coupled with a video surveillance system.

FIG. 4 illustrates an example of a network 400 employing an apparatus operable to detect whether a device is employing multiple addresses based on the location of the device that is coupled with a video surveillance system. In the illustrated example, there is a first area 402 monitored by a first camera (camera1) 404, and a second area 406 monitored by a second (camera2) 408. Cameras 404 and 408 are coupled to detection logic 414 via network 400.

In the illustrated example, the AP 410, coupled with detection logic 414 via network 400, receives a request for a network services (such as for example a DHCP request for an IP address) from a wireless device 412. Detection logic 414 receives data representative of the request from the AP 410. Detection logic 414 obtains the location of the requestor 412. Detection logic 414 may suitably comprise logic for determining the location of the requestor 412 and/or may obtain data representative of the requestor 412 from another device (not shown, e.g., a location server and/or a wireless Local Area Network (LAN) Controller (WLC), switch, etc.) via the network 400. If the detection logic 414 detects that the device has made previous requests for network services using a different address (which can be either a MAC address and/or an IP address), the detection logic 414 selectively compares the number of requests against a predefined threshold. If the number of requests exceeds the predefined threshold, the detection logic 414 may take corrective action. In the illustrated example, since the requestor 412 is in the first area monitored by the first camera 404, the detection logic may activate the camera or perform some other function such as begin recording, and/or generate an alarm and provide video from the first camera 404 with the alarm on a display, etc. The detection logic 414 may perform other actions in response to determining that the requestor 412 has exceeded the predefined threshold, such as re-allocating IP addresses previously assigned to the requestor 412 to the available address pool.

Figure 5:
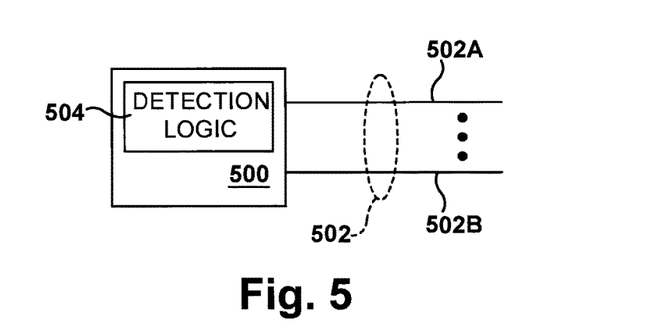
FIG. 5 is a block diagram illustrating an example of a device with a plurality of ports operable to detect whether a device is employing multiple addresses based on the device's location.

FIG. 5 is a block diagram illustrating an example of a device 500 with a plurality of ports 502 operable to detect whether a device coupled to one of the input ports (e.g., 502A, 502B) is employing multiple addresses. For example, if requests for network services received on one of the ports (502A and/or 502) contain different (e.g., MAC and/or IP) addresses, the detection logic 504 may provide virtual machine services to the port receiving the requests. As another example, if the number of requests for predefined network services (e.g., DHCP requests for IP addresses) exceed a predefined threshold, the detection logic 504 may determine an address starvation attack is in progress and may take corrective action such as ignoring requests from the port receiving the request, generating an alarm, and/or re-allocating the IP addresses assigned to devices coupled with the port receiving the request, etc. As those skilled in the art can readily appreciate from this example embodiment, the principles described herein are applicable to wired links as well as wireless links or any other network or communication links.

Figure 6:
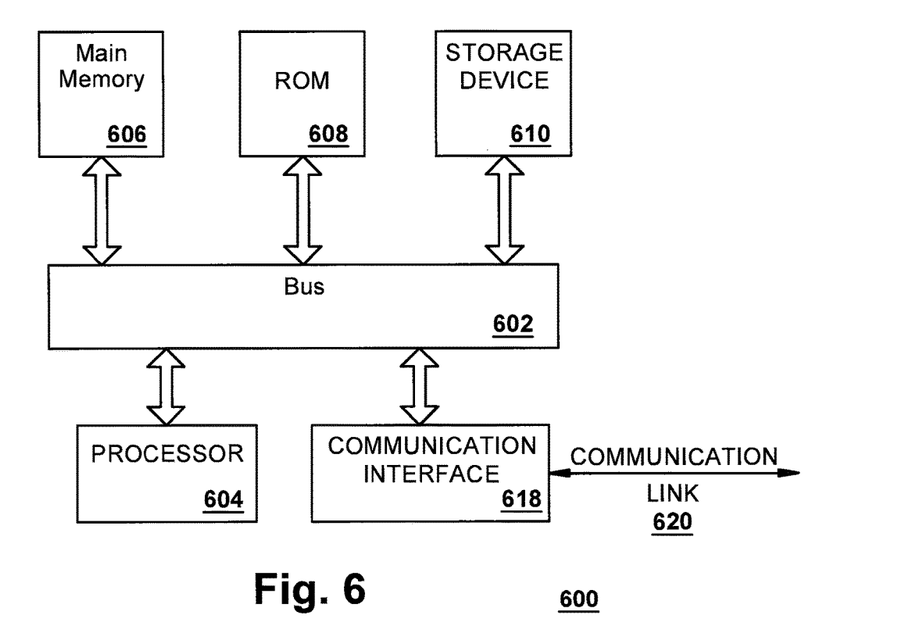
FIG. 6 is a block diagram illustrating an example of a computer system upon which an example embodiment can be implemented.

FIG. 6 is a block diagram illustrating an example of a computer system 600 upon which an example embodiment can be implemented. Computer system 600 may be employed to implement the functionality of the logic in AP 104 (FIGS. 1 and 2), detection logic 306 (FIG. 3), detection logic 414 (FIG. 4) and/or the detection logic 504 in apparatus 500 (FIG. 5).

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, optical disk, and/or flash storage, is provided and coupled to bus 602 for storing information and instructions.

An aspect of the example embodiment is related to the use of computer system 600 for providing detection of devices employing multiple addresses based on location. According to an example embodiment, detecting devices employing multiple addresses based on location is provided by computer system 600 in response to processor 604 executing one or more sequences of one or more instructions contained in a non-transitory main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any non-transitory medium that participates in providing instructions to processor 604 for execution. Such a medium may take many forms, including but not limited to non-volatile media, and volatile media. Non-volatile media include for example optical or magnetic disks, such as storage device 610. Volatile media include dynamic memory such as main memory 606. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606 from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling computer system 600 to a communication link 620. For example, communication interface 618 may be a local area network (LAN) card to provide a data communication connection to a compatible LAN. As another example, communication interface 618 may be an integrated services digital network (ISDN) card or a modem to provide a data communication connection to a corresponding type of telephone line. Wireless links may also be implemented. In any such implementation, communication interface 618 sends and receives electrical, electromagnetic, or optical signals that carry digital data streams representing various types of information.

Figure 7:
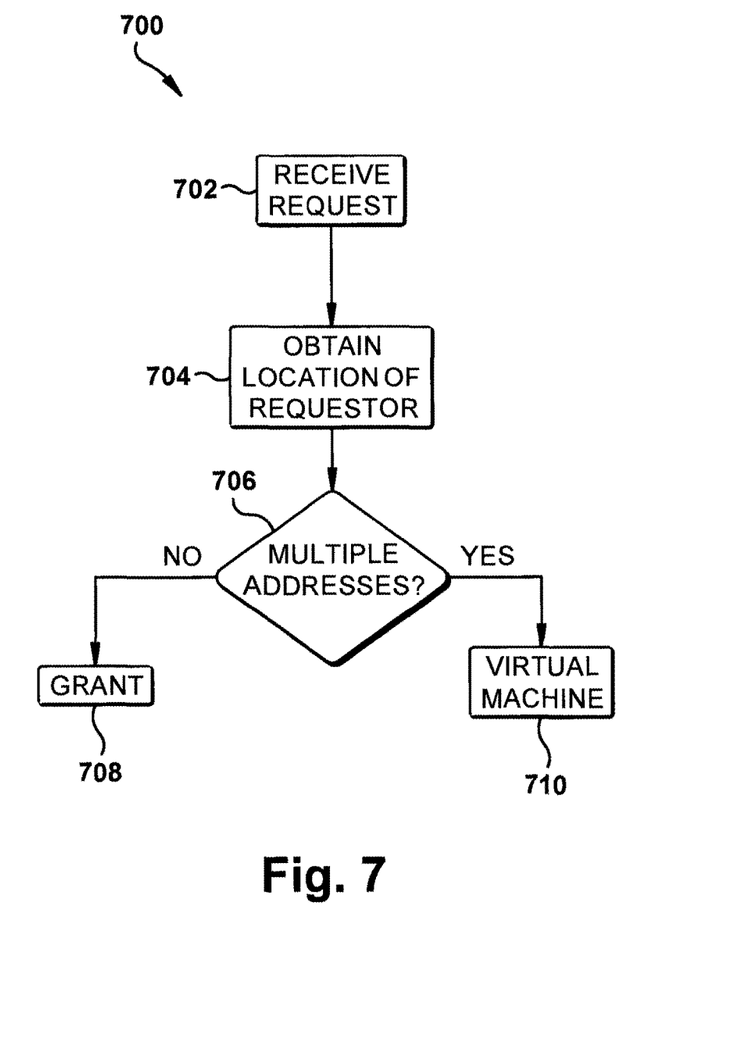
FIG. 7 is an example methodology for detecting whether a device is requesting network services from a plurality of addresses based on the device's location.
Figure 8:
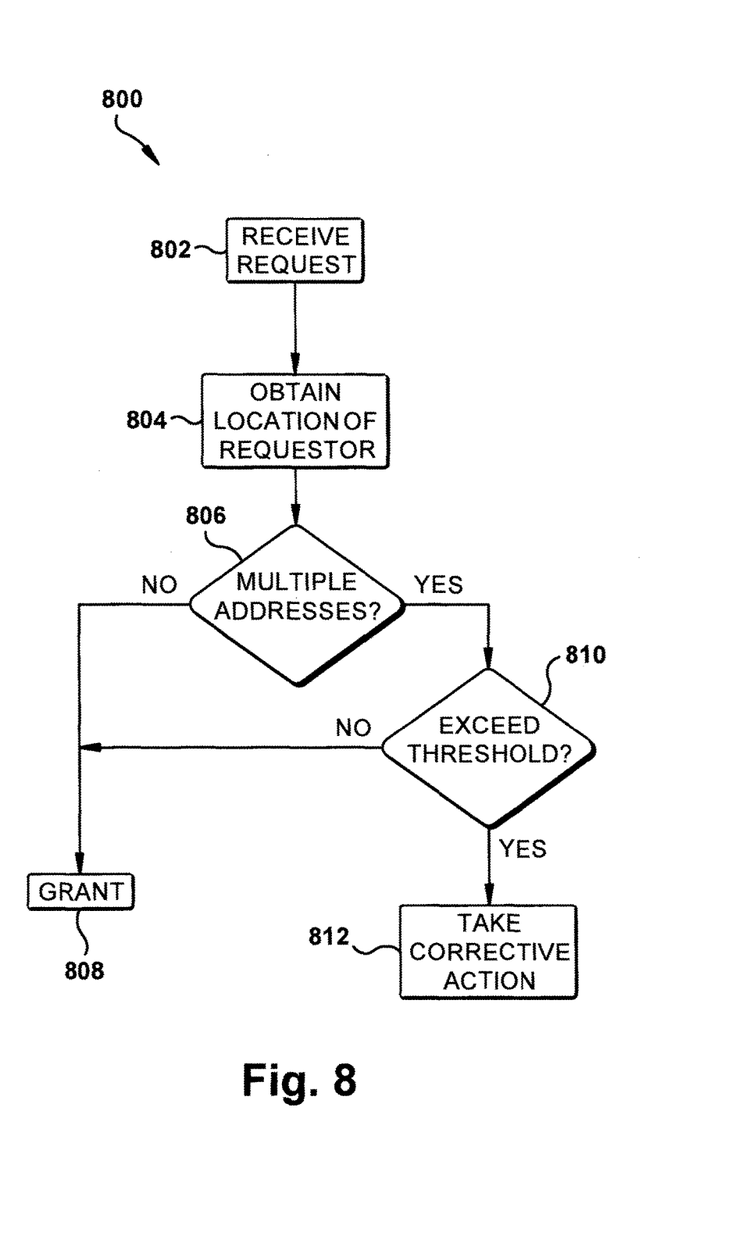
FIG. 8 is an example of a methodology for detecting an address starvation attack.

In view of the foregoing structural and functional features described above, a methodology in accordance with an example embodiment will be better appreciated with reference to FIGS. 7 and 8. While, for purposes of simplicity of explanation, the methodologies of FIGS. 7 and 8 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies described herein. The methodologies described herein are suitably adapted to be implemented in hardware, software when executed by a processor, or a combination thereof.

FIG. 7 is an example methodology 700 for detecting whether a device is requesting network services from a plurality of addresses, based on the device's location. Methodology 700 may be implemented by the logic in AP 104 (FIGS. 1 and 2), detection logic 306 (FIG. 3), detection logic 414 (FIG. 4) and/or the detection logic 504 in apparatus 500 (FIG. 5), and/or computer system 600 (FIG. 6).

At 702, a request for a network service is received from a device. The request comprises an address. The request can be any type of request for a network service, such as, for example, a DHCP request for an IP address, a request for a stream, a request for access to an application on the network, etc.

At 704, the location of the requestor is obtained. The location may be determined by the device receiving the request using any suitable technique, such as Received Signal Strength Indication (RSSI) and/or Angle of Arrival (AOA). In an example embodiment, data representative of the location of the requestor may be obtained.

At 706, a determination is made whether the requestor (device) has made other requests using different addresses based on the requestor's location. If the device is moving, the location of the device may be predicted using past location, velocity, and how much time has lapsed since device was at the past location.

If, at 706, it was determined that no other requests were made by the device using different addresses (NO), at 708, the request can be granted.

If, at 706, it was determined the device is using multiple addresses (YES), the device may be assumed to be employing virtual machines. At 710, services for supporting virtual machines are provided.

FIG. 8 is an example of a methodology 800 for detecting an address starvation attack. Methodology 800 may be implemented by the logic in AP 104 (FIGS. 1 and 2), detection logic 306 (FIG. 3), detection logic 414 (FIG. 4) and/or the detection logic 504 in apparatus 500 (FIG. 5), and/or computer system 600 (FIG. 6).

At 802, a request for a network service is received from a device. The request comprises an address. The request can be any type of request for a network service, such as, for example, a DHCP request for an IP address from a MAC address, a request for a stream from an IP address, a request for access to an application on the network from a MAC and/or IP address, etc.

At 804, the location of the requestor (requesting device) is obtained. The location may be determined by the device receiving the request using any suitable technique. In an example embodiment, data representative of the location of the requestor may be obtained.

At 806, a determination is made whether the requestor has made other requests using different addresses based on the requestor's location. If the device is moving, the location of the device may be predicted using past location, velocity, and how much time has lapsed since device was at the past location. If, at 806, it was determined that no other requests were made by the device using different addresses (NO), at 808, the request can be granted.

If, at 806, it was determined the device is using multiple addresses (YES), at 810 a determination is made whether the device has exceeded a predefined threshold. The threshold may be any suitable threshold. For example, if the request is a DHCP request for an IP address, the threshold may be directed to the number of requests made by the device or within a predefined area of the device. As another example, if the request is for a data stream, the threshold can be a bandwidth limit for the device. If, at 810, a determination was made that the device is not exceeding the predefined threshold (NO), the request can be granted as indicated at 808.

If, at 810, a determination was made that the device has exceeded the predefined threshold (YES), at 812 corrective action is taken. The type of corrective action taken may depend on the type of request and/or be based on predefined actions. For example, if a plurality of requests were received from a plurality of Internet Protocol MAC and/or IP addresses are determined to have been sent by the same device, the corrective action can include denying the request. As another example, if a plurality of requests were received from a plurality of Internet Protocol (IP) addresses determined to have been sent by the same device, and the threshold is directed to a bandwidth limit for the device (and the aggregate bandwidth of applications associated with the device exceed that bandwidth limit), the request may be denied or bandwidth limits may be enforced for the device. For example, packets may be dropped to enforce the bandwidth limit. As another example, the applications associated with the plurality of requests may be prioritized, and bandwidth may be limited for lower priority applications while the bandwidth of higher priority applications are not limited. For example, the bandwidth of a first application selected from a plurality of applications having a lower priority than a second application selected from the plurality of applications may be limited while the bandwidth of the second application is not limited.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A non-transitory computer-readable medium containing a program to mitigate impact of resource starvation attacks, the program executable to perform an operation comprising:
responsive to receiving, from a first device having a first media access control (MAC) address, a first Internet Protocol (IP) address assignment request specifying to assign the first device a first IP address previously offered to the first device, assigning the first IP address to the first device, wherein the first IP address is removed from a pool of available IP addresses when assigned to the first device;
receiving, from a second device having a second MAC address different from the first MAC address, a second IP address assignment request specifying to assign the second device a second IP address previously offered to the second device;
analyzing location data of the first and second devices based on a predefined positioning scheme and in order to determine a measure of geographical proximity of the first and second devices;
upon determining, based on the measure of geographical proximity, that the first and second devices are suggestive of being a single device notwithstanding the first and second MAC addresses being different MAC addresses, identifying the first and second IP address assignment requests as a resource starvation attack, by operation of one or more computer processors when executing the program; and
performing one or more corrective actions in order to mitigate impact of the resource starvation attack, the one or more corrective actions including capping an aggregate bandwidth consumed using the first and second IP addresses.

2. The non-transitory computer-readable medium of claim 1, wherein the operation further comprises determining whether a number of IP address assignment requests from the single device exceeds a predefined threshold.

3. The non-transitory computer-readable medium of claim 2, wherein the resource starvation attack is identified based further on the number of IP address assignment requests exceeding the predefined threshold.

4. The non-transitory computer-readable medium of claim 3, wherein the one or more corrective actions further include denying at least one IP address request.

5. The non-transitory computer-readable medium of claim 3, wherein the one or more corrective actions further include transmitting an alert.

6. The non-transitory computer-readable medium of claim 3, wherein the one or more corrective actions further include activating video surveillance of a geographical location of the single device.

7. An apparatus to mitigate impact of resource starvation attacks, the apparatus comprising:
one or more computer processors;
an interface;
detection logic operably connected with the interface and operable by the one or more computer processors to perform an operation comprising:
responsive to receiving, via the interface and from a first device having a first media access control (MAC) address, a first Internet Protocol (IP) address assignment request specifying to assign the first device a first IP address previously offered to the first device, assigning the first IP address to the first device, wherein the first IP address is removed from a pool of available IP addresses when assigned to the first device;
receiving, via the interface and from a second device having a second MAC address different from the first MAC address, a second IP address assignment request specifying to assign the second device a second IP address previously offered to the second device;
analyzing location data of the first and second devices based on a predefined positioning scheme and in order to determine a measure of geographical proximity of the first and second devices;
upon determining, based on the measure of geographical proximity, that the first and second devices are suggestive of being a single device notwithstanding the first and second MAC addresses being different MAC addresses, identifying the first and second IP address assignment requests as a resource starvation attack by the single device; and
performing one or more corrective actions in order to mitigate impact of the resource starvation attack, the one or more corrective actions including capping an aggregate bandwidth consumed using the first and second IP addresses.

8. The apparatus of claim 7, wherein the operation further comprises determining whether a number of IP address assignment requests from the single device exceeds a predefined threshold.

9. The apparatus set forth in claim 8, wherein the resource starvation attack is identified based further on the number of IP address assignment requests exceeding the predefined threshold; and
wherein the one or more corrective actions further include denying at least one IP address request.

10. The apparatus of claim 8, wherein the resource starvation attack is identified based further on the number of IP address assignment requests exceeding the predefined threshold; and
wherein the one or more corrective actions further include activating video surveillance of a geographical location of the single device.

11. The apparatus of claim 8, wherein the resource starvation attack is identified based further on the number of IP address assignment requests exceeding the predefined threshold;
wherein the one or more corrective actions further include, upon determining that a given network address previously assigned to the single device has not been used by the single device, reassigning the given network address to the single device.

12. The apparatus of claim 8, wherein the one or more corrective actions further include reassigning a given network address previously assigned to the single device, upon determining that the single device has not used the given network address.

13. A computer-implemented method to mitigate impact of resource starvation attacks, the computer-implemented method comprising:
responsive to receiving, from a first device having a first media access control (MAC) address, a first Internet Protocol (IP) address assignment request specifying to assigning the first device a first IP address previously offered to the first device, assigning the first IP address to the first device, wherein the first IP address is removed from a pool of available IP addresses when assigned to the first device;
receiving, from a second device having a second MAC address different from the first MAC address, a second IP address assignment request specifying to assign the second device a second IP address previously offered to the second device;
analyzing location data of the first and second devices based on a predefined positioning scheme and in order to determine a measure of geographical proximity of the first and second devices;
upon determining, based on the measure of geographical proximity, that the first and second devices are suggestive of being a single device notwithstanding the first and second MAC addresses being different MAC addresses, identifying the first and second IP address assignment requests as a resource starvation attack, by operation of one or more computer processors; and
performing one or more corrective actions in order to mitigate impact of the resource starvation attack, the one or more corrective actions including capping an aggregate bandwidth consumed using the first and second IP addresses.

14. The computer-implemented method of claim 13, further comprising:
determining whether a plurality of IP address assignment requests from the single device exceeds a predetermined threshold count of requests, the plurality of IP address assignment requests including the first and second IP address assignment requests, wherein the one or more corrective actions are performed upon determining that the plurality of IP address assignment requests exceeds the predetermined threshold.

15. The computer-implemented method of claim 13, wherein the first IP address assignment request identifies the first MAC address of the first device, wherein the second IP address assignment request identifies the second MAC address of the second device;
wherein the resource starvation attack is identified based further on a determination that the single device has placed beyond a threshold count of IP address assignment requests, each of which identifies a different MAC address, wherein the threshold count is predefined and user-configurable;
wherein upon determining that the single device has not placed beyond the threshold count of IP address assignment requests, the single device is determined to have multiple virtual machines and not engaging in any resource starvation attack, whereupon the second IP address assignment request is serviced without performing any corrective action, wherein the second IP address is removed from the pool of available network addresses when assigned to the single device.

16. The computer-implemented method of claim 15, wherein the predefined positioning scheme comprises, in respective instances:
(i) received signal strength indicator (RSSI); and
(ii) angle of arrival (AoA);
wherein the aggregate bandwidth is capped in a first instance, wherein impact of resource starvation attacks is mitigated by, in respective instances other than the first instance, performing each corrective action selected from:
(i) assigning the second IP address to the single device but releasing the first IP address and returning the first IP address to the pool of available IP addresses;
(ii) denying the second IP address assignment request;
(iii) generating an alert that the resource starvation attack was detected, wherein the alert is output to at least one of the single device and an administrative user;
(iv) activating video surveillance at a geographical location of the single device; and
(v) upon determining that a given network address previously allocated to the single device has not been used by the single device, reassigning the given network address to the single device.

17. The computer-implemented method of claim 16, wherein the first device is at a first geographical location, wherein the second device is at a second geographical location, wherein the second IP address assignment request is received subsequent to assigning the first device the first IP address, wherein the second geographical location is proximate to the first geographical location, wherein the first and second devices each comprise a wireless device, wherein the single device comprises a moving device;
wherein the first IP address is specified in the first IP address assignment request, wherein the second IP address is specified in the second IP address assignment request, wherein upon not detecting any resource starvation attack, the second IP address is assigned to the second device without any correction action performed.

18. The computer-implemented method of claim 17, wherein the location data does not include any MAC address of any device, wherein the first and second network addresses are not MAC addresses, wherein that the first and second devices are actually a single device is determined despite the second device having both a different geographical location than the first device and having a different MAC address than the first device.

19. The computer-implemented method of claim 18, wherein only the aggregate bandwidth consumed by a given application using the first and second IP addresses is capped, comprising:
determining a bandwidth limitation for the single device;
aggregating bandwidth usage specific to the given application and for a plurality of IP addresses associated with the single device, the plurality of IP addresses including the first and second IP addresses; and
upon determining that the aggregated bandwidth usage exceeds the bandwidth limitation, restricting the aggregate bandwidth consumed by the given application using the first and second IP addresses.

20. The computer-implemented method of claim 19, wherein restricting the aggregate bandwidth consumed by the given application using the first and second IP addresses comprises:
determining a plurality of distinct applications executing on the single device and responsible for the bandwidth usage;
determining a priority for each of the plurality of distinct applications executing on the single device; and
restricting bandwidth for a first application having a lower priority than a second application, while not limiting bandwidth for the second application, wherein the plurality of distinct applications includes the first and second applications.

21. The computer-implemented method of claim 13, wherein the predefined positioning scheme is selected from received signal strength indicator (RSSI) and angle of arrival (AoA).

* * * * *

UNITED STATES PATENT AND TRADEMARK OFFICE
CERTIFICATE OF CORRECTION

PATENT NO.        : 9,755,943 B2
APPLICATION NO.   : 13/961991
DATED             : September 5, 2017
INVENTOR(S)       : Mark Krischer et al.

It is certified that error appears in the above-identified patent and that said Letters Patent is hereby corrected as shown below:

On the Title Page

In item (72), in Column 1, in "Inventors", Lines 1-2, delete "Tom Koenig," and insert -- Thomas Koenig, --, therefor.

Signed and Sealed this
Twentieth Day of February, 2018

Andrei Iancu
*Director of the United States Patent and Trademark Office*